United States Patent
Nishikawa

(10) Patent No.: US 8,014,177 B2
(45) Date of Patent: Sep. 6, 2011

(54) SWITCHING POWER SUPPLY WITH PULSE FREQUENCY MODULATION CONTROL

(75) Inventor: Yukihiro Nishikawa, Hino (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 440 days.

(21) Appl. No.: 12/318,932

(22) Filed: Jan. 13, 2009

(65) Prior Publication Data

US 2009/0184698 A1    Jul. 23, 2009

(30) Foreign Application Priority Data

Jan. 22, 2008 (JP) ................................. 2008-011206

(51) Int. Cl.
*H02M 3/335* (2006.01)
*H02M 1/12* (2006.01)

(52) U.S. Cl. ............... 363/24; 363/25; 363/26; 363/40; 363/41; 363/95; 363/98; 363/133; 363/134

(58) Field of Classification Search ............... 363/24, 363/25, 26, 40, 41, 95, 98, 131, 133, 134
See application file for complete search history.

(56) References Cited

U.S. PATENT DOCUMENTS

| | | | | |
|---|---|---|---|---|
| 5,654,881 | A | * | 8/1997 | Albrecht et al. ............... 363/25 |
| 7,352,596 | B2 | * | 4/2008 | Cheng .......................... 363/24 |
| 7,573,731 | B2 | * | 8/2009 | Kwon et al. ................... 363/25 |
| 7,596,009 | B2 | * | 9/2009 | Matsumoto .................... 363/89 |
| 2005/0024901 | A1 | * | 2/2005 | Ying et al. ..................... 363/24 |
| 2007/0053210 | A1 | | 3/2007 | Nomura et al. |
| 2007/0097715 | A1 | * | 5/2007 | Choi ............................. 363/24 |
| 2008/0112195 | A1 | * | 5/2008 | Liang et al. ................... 363/24 |
| 2008/0239768 | A1 | * | 10/2008 | Aso .............................. 363/25 |

FOREIGN PATENT DOCUMENTS

| | | |
|---|---|---|
| JP | H06-030557 | 2/1994 |
| JP | H08-228486 | 9/1996 |
| JP | S52-68916 | 6/1997 |

* cited by examiner

*Primary Examiner* — Bao Q Vu
(74) *Attorney, Agent, or Firm* — Manabu Kanesaka

(57) ABSTRACT

A switching power supply exhibits high conversion efficiency and facilitates reducing the size thereof. The switching power supply includes a half-bridge circuit including a first series circuit formed of switching devices Q1 and Q2 and connected between the output terminals of a DC power supply; and a second series circuit connecting primary inductance Lr1 of transformer T1, primary inductance Lr2 of transformer T2 and capacitor Cr in series. The second series circuit is connected between the output terminals of the half-bridge circuit, and is made to conduct a series resonance operation. The switching devices Q1 and Q2 is controlled at the ON-duties of 0.5 for reducing the breakdown voltages of rectifying diodes D1 and D2 on the secondary side of transformers T1 and T2 and for improving the conversion efficiency of the switching device.

7 Claims, 9 Drawing Sheets

ON-duty = 0.5, Pulse Frequency Modulation Control

ON-duty = 0.5, Pulse Frequency Modulation Control

Frequency fixed, ON-duty Control

ON-duty = 0.5, Pulse Frequency Modulation Control

SWITCHING POWER SUPPLY WITH PULSE FREQUENCY MODULATION CONTROL

BACKGROUND OF THE INVENTION AND RELATED ART STATEMENT

The present invention relates to a switching power supply. Specifically, the invention relates to an isolation type DC-DC converter that obtains a DC output insulated from a commercial AC power supply.

A DC output isolated from a commercial AC power supply is obtained usually with an isolation type DC-DC converter from an intermediate DC voltage obtained by rectifying and smoothing an AC voltage. In a power supply, to which the specifications on the higher harmonic of an input current are applied, an intermediate DC voltage is obtained from an AC power supply via a boost chopper circuit.

It has been required for the switching power supply apparatuses to exhibit a high efficiency, to cause less noises, to be small in size, to be manufactured with low manufacturing costs, and to be very reliable. For meeting the demands described above, various circuit configurations have been proposed.

FIG. 5 is a block circuit diagram of a conventional switching power supply. The conventional switching power supply has a circuit configuration almost similar to the circuit configurations of the isolation type DC-DC converters described in the following Patent Documents 1 and 2.

Now the operations of the DC-DC converter shown in FIG. 5 will be described below with reference to the wave chart described in FIG. 6.

Feedback circuit FB1 shown in FIG. 5 amplifies the error caused between an output voltage $V_o$ and the set value (reference value) of the output voltage. Control circuit Cont1 turns ON and OFF MOSFETs Q1 and Q2 alternately at a preset fixed frequency fs (=1/T) during a period excluding dead times Td1 and Td2 set for MOSFETs Q1 and Q2 respectively. At the same time, control circuit Cont 1 controls the output voltage $V_o$ at a constant value by means of controlling the ON-duties of MOSFETs Q1 and Q2 in response to an output signal (feedback signal) VFB fed from feedback circuit FB1.

Transformers T1 and T2 are represented by the respective equivalent circuits including exciting inductance Lm1 and exciting inductance Lm2, leakage inductance Lr1 and leakage inductance Lr2, primary windings Np1 and Np2, and secondary windings Ns1 and Ns2, respectively.

Capacitor Cr cuts the DC component of the currents which flow through the primary windings of transformers T1 and T2 to prevent DC magnetization from causing.

Inductance element $L_z$ resonates partially with capacitor $C_s$, when MOSFETs Q1 and Q2 conduct switching, to make MOSFETs Q1 and Q2 perform zero-voltage switching. Inductance element $L_z$ may be omitted by employing leakage inductance Lr1 of transformer T1 and leakage inductance Lr2 of transformer T2 in substitution for inductance element $L_z$. In the following descriptions, inductance element $L_z$ is omitted. Capacitor $C_s$ may be omitted by employing the parasitic capacitance of MOSFETs Q1 and Q2 in substitution for capacitor $C_s$.

By setting the resonance frequency of the series circuit consisting of primary inductance (Lm1 and Lr1) of transformer T1, primary inductance (Lm2 and Lr2) of transformer T2, and capacitor $C_r$ to be much lower than the switching frequency fs, currents IQ1 and IQ2 flowing through MOSFETs Q1 and Q2 are made to rise linearly.

In a period (t0<t<t3), for which MOSFET Q1 is ON, energy is fed from a DC power supply to the load side via transformer T1. In this period, transformer T2 works for a choke coil. In a period (t3<t<t0), for which MOSFET Q2 is ON, energy is fed from capacitor $C_r$ to the load side via transformer T2. In this period, transformer T1 works for a choke coil.

Rectifying diode D1 becomes conductive as MOSFET Q2 shifts from the ON-state thereof to the OFF-state thereof at a time t0 and current ID1 increases at a gradient of $V_o/(Lr1+Lr2)$. Current ID2 that flows through rectifying diode D2 decreases at a gradient of $-V_o/(Lr1+Lr2)$ as MOSFET Q2 shifts from the ON-state thereof to the OFF-state thereof. As current ID2 becomes zero at a time t2, rectifying diode D2 shifts to the OFF-state thereof. As MOSFET Q1 shifts from the ON-state thereof to the OFF-state thereof at the time t3, current ID1 decreases at the gradient of $-V_o/(Lr1+Lr2)$. As current ID1 becomes zero at a time t5, rectifying diode D1 shifts to the OFF-state thereof. Current ID2 that flows through rectifying diode D2 increases at the gradient of $V_o/(Lr1+Lr2)$.

FIG. 8 is a block circuit diagram of another conventional switching power supply. The conventional switching power supply shown in FIG. 8 has a circuit configuration almost similar to the circuit configuration of the isolation type DC-DC converter described in the following Patent Document 3.

Now the operations of the DC-DC converter shown in FIG. 8 will be described below with reference to the wave chart described in FIG. 9.

Control circuit Cont1 turns ON and OFF MOSFETs Q1 and Q2 alternately at an ON-duty of 0.5 during a period excluding dead times Td1 and Td2 set for MOSFETs Q1 and Q2 respectively. At the same time, control circuit Cont1 controls the switching frequency fs of MOSFETs Q1 and Q2 in response to the output signal VFB fed from feedback circuit FB1. Thus, control circuit Cont1 controls the output voltage $V_o$ at a constant value.

In FIG. 8, transformer T3 is represented by an equivalent circuit including exciting inductance Lm1, leakage inductance Lr, primary winding Np1, and secondary windings Ns1 and Ns2.

Capacitor Cr cuts the DC component of the current which flows through the primary winding of transformer T1 to prevent DC magnetization from causing. Capacitor Cr constitutes a resonance circuit together with exciting inductance Lm of transformer T1, leakage inductance Lr of transformer T1 and inductance element Lz.

Inductance element $L_z$ resonates partially with capacitor $C_s$, when MOSFETs Q1 and Q2 conduct switching, to make MOSFETs Q1 and Q2 perform zero-voltage switching. Inductance element $L_z$ may be omitted by employing leakage inductance Lr of transformer T1 in substitution for inductance element $L_z$. From the following descriptions, inductance element $L_z$ is omitted. Capacitor $C_s$ may be omitted by employing the parasitic capacitance of MOSFETs Q1 and Q2 in substitution for capacitor $C_s$.

As MOSFET Q1 shifts to the ON-state thereof, leakage inductance Lr and resonance capacitor Cs resonate, shaping currents IQ1 and ID1 with sinusoidal waveforms, respectively. As current ID1 becomes zero at the time t3, diode D1 becomes OFF and primary inductance (Lm and Lr) of transformer T1 and capacitor Cr resonate, making a current having a sinusoidal waveform, the frequency of which is low, flow through MOSFET Q1.

Patent Document 1: Japanese Unexamined Patent Application Publication No. Hei. 8 (1996)-228486 (FIG. 1).

Patent Document 2: Japanese Unexamined Patent Application Publication No. 2007-74830 (FIGS. 7 and 8) corresponding to U.S. Patent Application Publication No. US 2007/0053210 A1.

Patent Document 3: Japanese Patent No. 2734296 (FIG. 1)

According to the Patent Document 2, the output voltage $V_o$ from the circuit shown in FIG. 5 is described by the following equation (1) that includes a DC power supply voltage Vin, an ON-duty D and a winding ratio n (=Np1/Ns1=Np2/Ns2) in transformers T1 and T2.

$$V_o = D \cdot (1-D) \cdot \text{Vin}/n \qquad (1)$$

The equation (1) indicates that the output voltage $V_o$ is controlled by controlling the ON-duty D.

Now a voltage conversion rate M is defined that $M=2n \cdot V_o/\text{Vin}$. Then, the voltage conversion rate M is described by the following equation (2).

$$M = 2D \cdot (1-D) \qquad (2)$$

As described in FIG. 7, the voltage conversion rate M shows the maximum at the ON-duty D of 0.5. Since the output voltage $V_o$ of a general forward converter is described by the following equation (3) according to the Patent Document 2, the winding ratio n of the transformers can be made to be small. As a result, the leakage inductance can be reduced, the high-frequency characteristics can be improved, and the transformers can be made to be small in size.

$$V_o = D \cdot \text{Vin}/n \qquad (3)$$

However, when the winding ratio n is smaller, a higher reverse voltage is applied to diodes D1 and D2. Therefore, it is necessary to prepare diodes exhibiting a higher breakdown voltage, when the winding ratio n is small. Since the forward voltage drop across a diode becomes larger as the breakdown voltage of the diode becomes higher, more losses are caused in the diode, lowering the conversion efficiency of the switching power supply.

The Patent Document 3 defines the period, for which currents flow through diodes D1 and D2 in the circuit shown in FIG. 8, as an "electric-power transfer period" and the period, for which any current does not flow through diodes D1 and D2 in the circuit shown in FIG. 8, as an "electric-power interruption period". The circuit shown in FIG. 8 adjusts the ratio of the electric-power transfer period and the electric-power interruption period to control the output voltage $V_o$ at a constant value.

Even when the load becomes heavy in the case described above, there certainly exists a period, for which the value of a synthesized current, obtained by rectifying and synthesizing the currents flowing through diodes D1 and D2, is zero. During the period described above, the effective values of the currents flowing through the transformer secondary windings and the diodes increase, lowering the conversion efficiency. Since the effective current value of smoothing capacitor $C_o$ is also large, it is necessary for smoothing capacitor $C_o$ to be large. Large smoothing capacitor $C_o$ is hazardous for reducing the size of the switching power supply.

Now another problem of the conventional switching power supply will be described below.

The voltage conversion rate M of the circuit shown in FIG. 8 shows characteristic changes as described in FIG. 10.

In FIG. 10, the vertical axis represents the normalized frequency F that is the ratio of the switching frequency Fs and the resonance frequency Fr of leakage inductance Lr and capacitor Cr. If described by an equation, F=Fs/Fr. The voltage conversion rate M exhibits dependencies on the load resistance $R_o$ in the operation region, in which M is larger than 1 and F is smaller than 1 (M>1, F<1). Especially, the frequency, at which the voltage conversion rate M shows the maximum, changes depending on the load. At the normalized frequency F of 1, the switching frequency Fs and the resonance frequency Fr coincide with each other. At the normalized frequency F of 1, the period between t3 and t4 in FIG. 9 does not exist. At the normalized frequency F of less than 1, a resonance current due to primary inductance (Lm and Lr) of transformer T1 and capacitor Cr flows during the periods t3<t<t4 and t7<t<t0.

As the switching frequency exceeds the frequency, at which the voltage conversion rate M shows the maximum, to the lower side, the switching power supply shown in FIG. 8 operates as indicated by the waveforms described in FIG. 11. Usually, the state is called current leading mode.

As the resonance current turns from positive to negative during the ON-period of MOSFET Q1 for example, current flows through the body diode of MOSFET Q1. Even if MOSFET Q1 is turned off, the current will keep flowing through the body diode of MOSFET Q1. As MOSFET Q2 is turned on, the body diode of MOSFET Q1 conducts reverse recovery, making a large through current flow. If this state continues, MOSFET Q1 will be broken down by the heat generated therein, since the reverse recovery losses caused by the body diode of MOSFET Q1 are large.

For preventing the current leading mode from causing, it is effective to make control circuit Cont1 limit the normalized frequency F to be lower than Fmin. However, the point, at which the voltage conversion rate M shows the maximum, changes greatly depending on the load as described in FIG. 10. Therefore, it is very difficult to set the frequency Fmin, at which off-resonance is prevented from causing under all the unfavorable conditions including sudden change of the DC power supply voltage, sudden change caused in the load, and overload.

The present invention has been made to obviate the above problems in the conventional switching power supply.

Further objects and advantages of the invention will be apparent from the following description of the invention.

SUMMARY OF THE INVENTION

According to a first aspect of the invention, there is provided a switching power supply for obviating the problems described above, the switching power supply comprising:

a DC power supply;

a first series circuit connected in parallel to the DC power supply, the first series circuit including a first switching circuit and a second switching circuit connected in series to each other;

the first switching circuit including a first parallel circuit, the first parallel circuit including a first switching device, a first diode, and a first capacitor;

the second switching circuit including a second parallel circuit, the second parallel circuit including a second switching device, a second diode, and a second capacitor; and a second series circuit including an inductance element, a primary winding of a first transformer, a primary winding of a second transformer, and a capacitor, the second series circuit being connected in parallel to any of the first and second switching circuits;

wherein the switching power supply rectifies and smoothes a voltage generated across a secondary winding of the first transformer and a voltage generated across a secondary winding of the second transformer for obtaining a DC output; and the switching power supply turns on and off the first switching device and the second switching device alternately at a switching frequency higher than a series resonance frequency determined by the sum of the inductance value of the inductance element, the inductance value of the first transformer and the inductance value of the second transformer, and the capacitance value of the capacitor.

According to a second aspect of the invention, the switching power supply includes a control circuit that sets the ON-duties of the first and second switching devices at 0.5 and adjusts the switching frequency for controlling the voltage of the DC output at a constant value.

According to a third aspect of the invention, the primary inductance value of the first transformer and the primary inductance value of the second transformer are almost equal to each other; and the winding ratio of the first transformer and the winding ratio of the second transformer are equal to each other.

According to a fourth aspect of the invention, the switching power supply includes a control circuit, which controls a minimum value of the switching frequency to be higher than the series resonance frequency determined by the sum of the inductance value of the inductance element, the inductance value of the first transformer and the inductance value of the second transformer, and the static capacitance value of the capacitor.

According to a fifth aspect of the invention, the winding ratio n of the primary winding and the secondary winding in the first and second transformers is set to be described by the following relational expression, $n > Vin (max)/(4V_o)$, wherein Vin (max) is a maximum input voltage from the DC power supply and $V_o$ is the voltage of the DC output.

According to a sixth aspect of the invention, the switching power supply includes a control circuit, which controls a switching frequency in response to a feedback signal for controlling the voltage of the DC output, fixes the switching frequency in response to the feedback signal exceeding a value corresponding to the upper limit value of the switching frequency to the lower side, and changes the ON-duties of the first and second switching devices variably for controlling the voltage of the DC output.

According to a seventh aspect of the invention, the winding ratio n of the primary and secondary windings in the first and second transformers is set to be described by the following relational expression, $n < Vin (max)/(4V_o)$, wherein Vin (max) is a maximum input voltage from the DC power supply and $V_o$ is the voltage of the DC output; and the switching power supply includes a control circuit, which controls a switching frequency in response to a feedback signal for controlling the voltage of the DC output, fixes the switching frequency in response to the feedback signal exceeding a value corresponding to the upper limit value of the switching frequency to the lower side, and changes the ON-duties of the first and second switching devices variably, by which to control the voltage of the DC output.

According to the first through fourth aspects of the invention, the output voltage is controlled at a constant value without setting the winding ratios of the transformers to be small. Therefore, diodes exhibiting a low breakdown voltage may be used with no problem and the conversion efficiency is improved.

According to the fifth aspect of the invention, the minimum frequency set for preventing current leading mode from causing is set easily and the reliability of the switching power supply is improved.

According to the sixth aspect of the invention, the switching frequency is prevented from rising under a light load, the exciting current of the transformer is suppressed at a low value, and the conversion efficiency is improved independently of the load weight.

According to the seventh aspect of the invention, the magnetic flux amplitude under a heavy load is suppressed to be small and the core losses are reduced.

DETAILED DESCRIPTION OF PREFERRED EMBODIMENTS

Now the invention will be described in detail hereinafter with reference to the accompanied drawings which illustrate the preferred embodiments of the invention.

Figure 1:
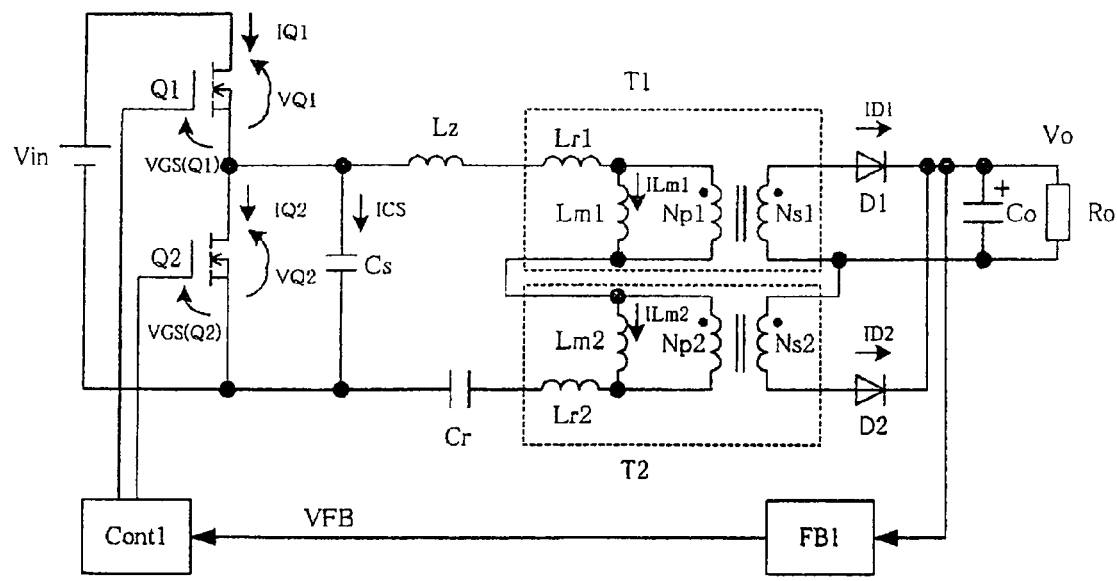
FIG. 1 is a block circuit diagram of a switching power supply according to the invention.

FIG. 1 is a block circuit diagram of a switching power supply according to a first embodiment of the invention. (The first aspect of the invention)

Figure 5:
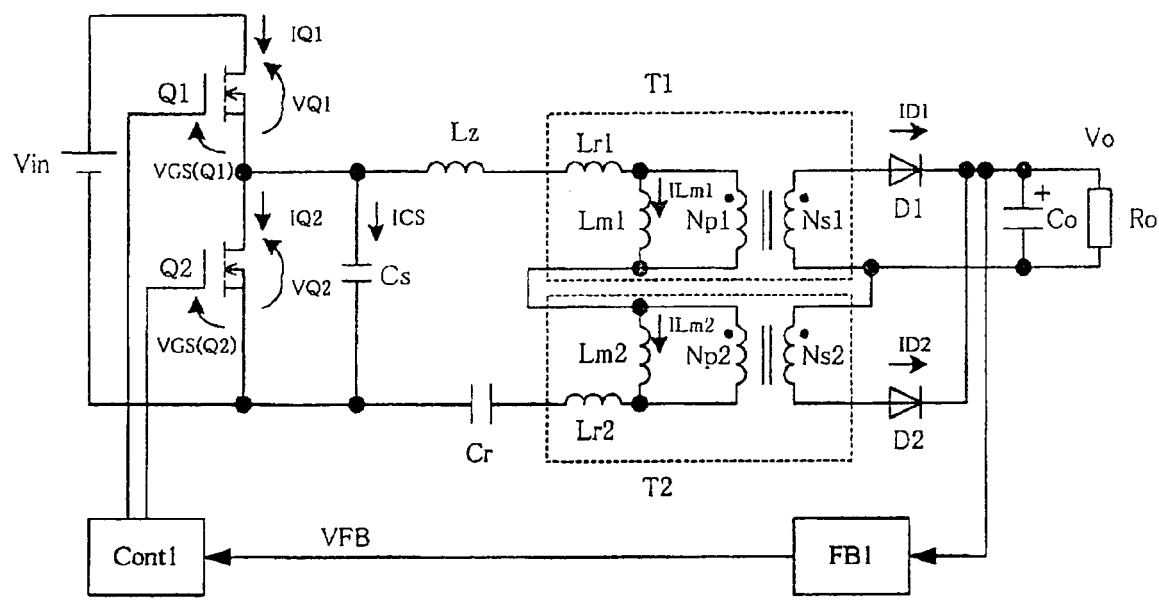
FIG. 5 is a block circuit diagram of a conventional switching power supply.
Figure 6:
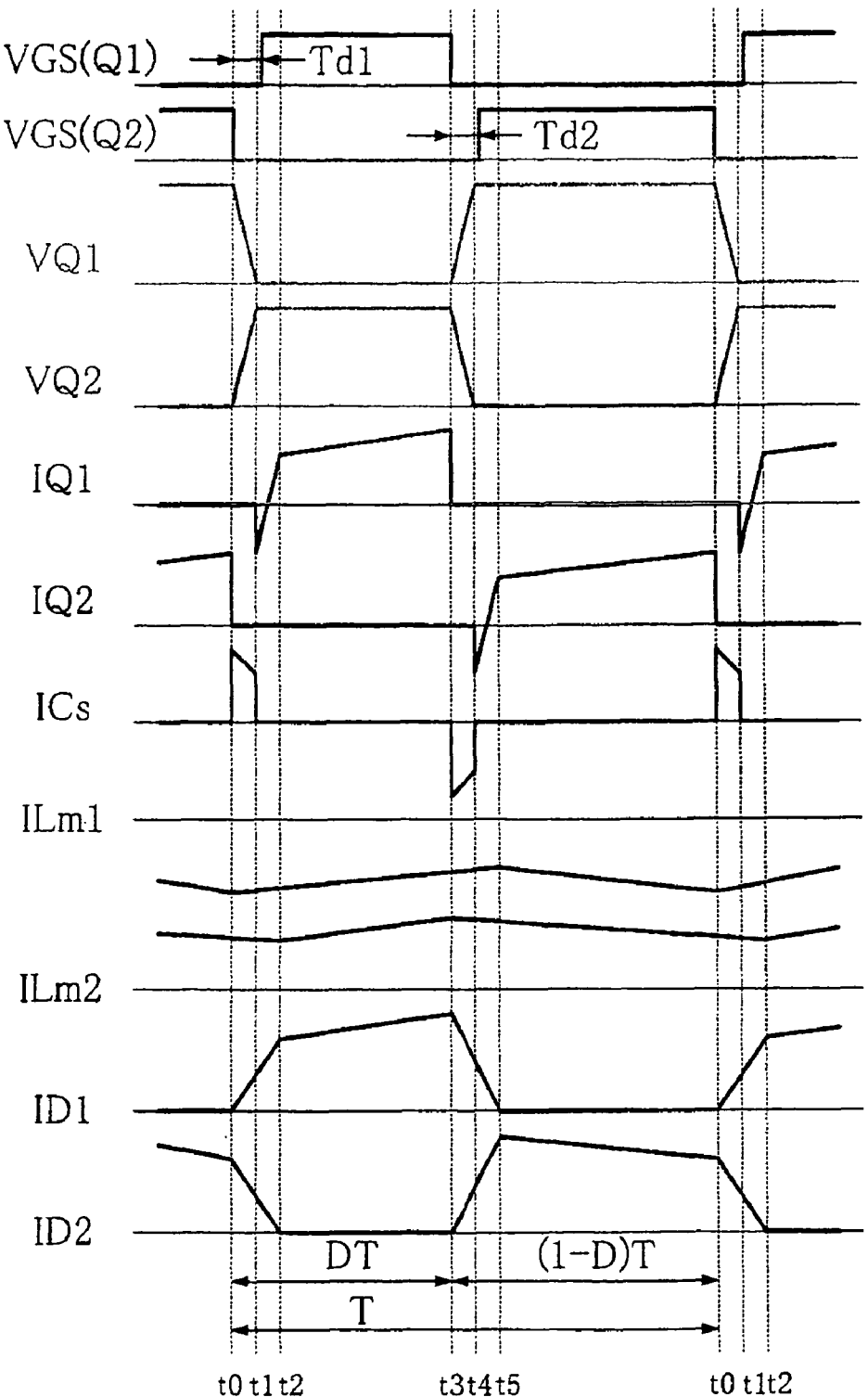
FIG. 6 is a wave chart describing the operations of the circuit shown in FIG. 5.
Figure 7:
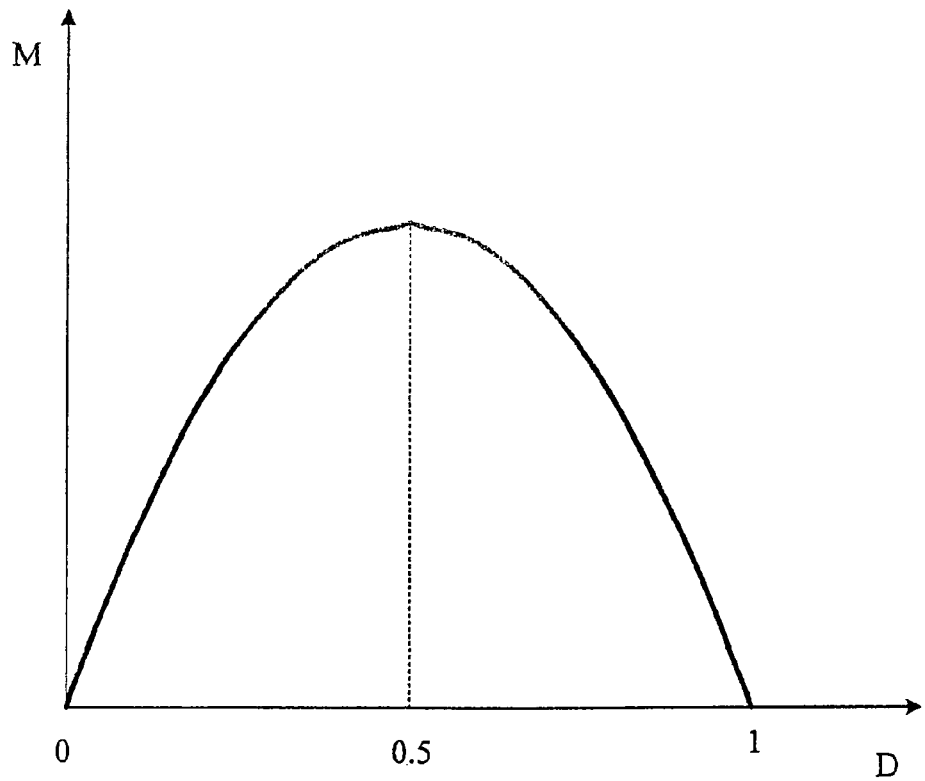
FIG. 7 is a curve relating to the voltage conversion rate M with the ON-duty D.

The switching power supply shown in FIG. 1 is different from the switching power supply shown in FIG. 5 in that a series resonance circuit is configured by the inductance components of transformers T1 and T2, inductance element $L_z$ and capacitor Cr, and control circuit Cont1 conducts frequency control at the ON-duty set at 0.5 in the switching power supply shown in FIG. 1. Although the circuit configuration shown in FIG. 1 is the same as the circuit configuration shown in FIG. 5, any series resonance circuit is not formed in FIG. 5. Although there exists parasitic capacitance and internal inductance in parallel to MOSFETs Q1 and Q2 in FIG. 1 as well as in FIG. 5, the parasitic capacitance and the internal inductance are not illustrated in FIGS. 1 and 5.

Figure 2:
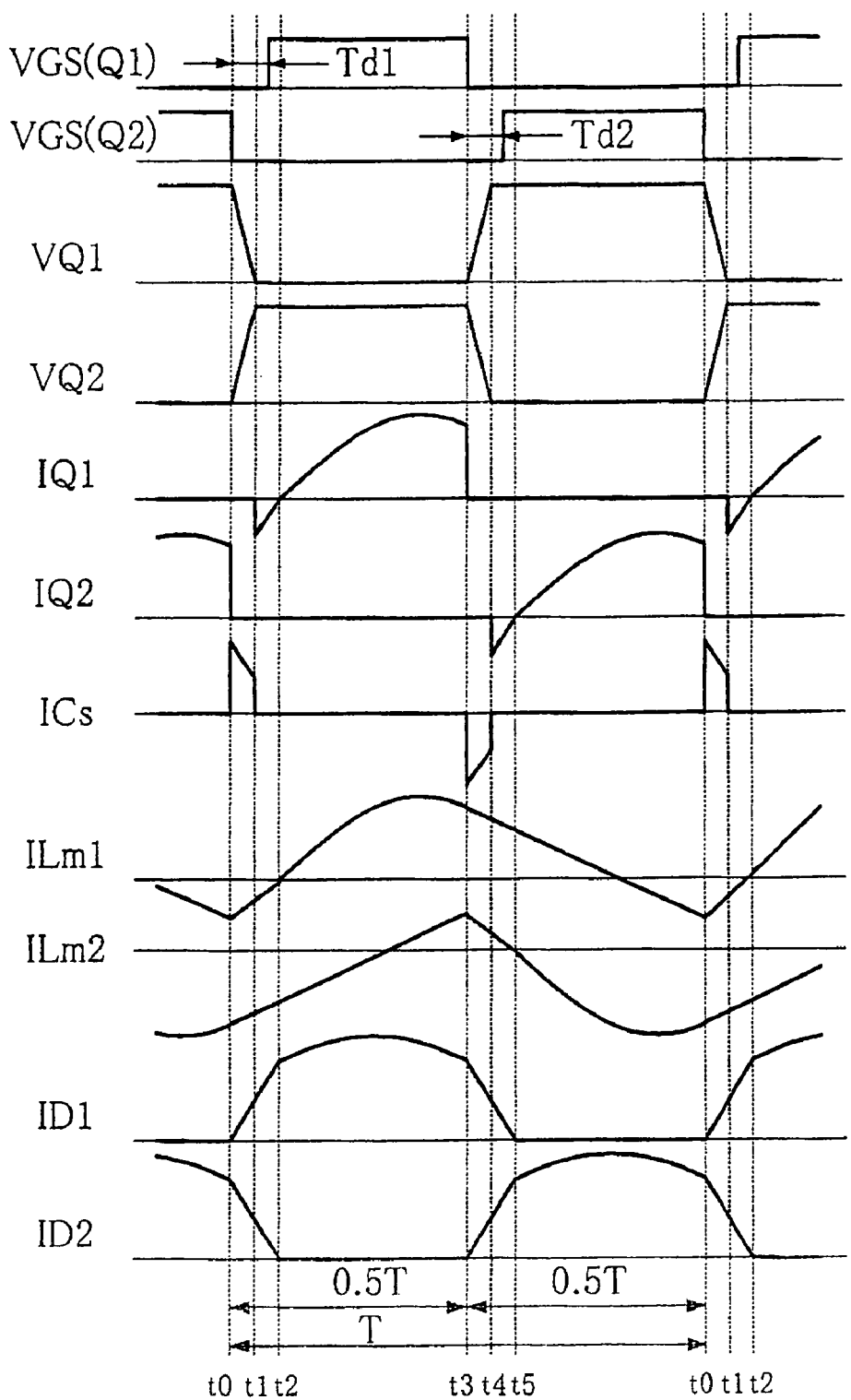
FIG. 2 is a wave chart describing the operations of the circuit shown in FIG. 1.

Now the operations of the switching power supply shown in FIG. 1 will be described below with reference to the wave chart shown in FIG. 2.

Inductance element $L_z$ resonates partially with capacitor $C_s$, when MOSFETs Q1 and Q2 conduct switching, to make MOSFETs Q1 and Q2 perform zero-voltage switching. Inductance element $L_z$ may be omitted by employing leakage inductance Lr1 of transformer T1 and leakage inductance Lr2 of transformer T2 in substitution for inductance element $L_z$. In the following descriptions, inductance element $L_z$ is omitted. Capacitor $C_s$ may be omitted by employing the parasitic capacitance of MOSFETs Q1 and Q2 in substitution for capacitor $C_s$.

The primary inductance of transformer T1 and the primary inductance of transformer T2 are set to be almost the same. The winding ratio in transformer T1 and the winding ratio in transformer T2 are set to be the same. The ON-duty of MOSFETs Q1 and Q2 is set at 0.5. Due to the settings described above, the waveform of current IQ1 and the waveform of current IQ2 are symmetrical with each other and the waveform of current ID1 and the waveform of current ID2 are symmetrical with each other. Therefore, the heat quantity generated by the losses caused in MOSFET Q1 and the heat quantity generated by the losses caused in MOSFET Q2 are equal to each other. The heat quantity generated by the losses caused in diode D1 and the heat quantity generated by the losses caused in diode D2 are equal to each other.

MOSFETs Q1 and Q2 and diodes D1 and D2 are thermally coupled to the respective common heat sinks and cooled thereby. The cooling capability of the heat sink is determined considering the calorific value of MOSFET Q1 or Q2 (diode D1 or D2), that generates more heat. If an imbalance exists between the calorific values of MOSFETs Q1 and Q2 (diodes D1 and D2), a larger heat sink will be selected to meet the requirement of the element that generates more heat.

As described above, the heat quantity caused by the losses of MOSFET Q1 and the heat quantity caused by the losses of MOSFET Q2 are equal to each other, and heat quantity caused by the losses of diode D1 and the heat quantity caused by the losses of diode D2 are equal to each other according to the invention. Therefore, it is not necessary to use an excessively large heat sink according to the invention. As a result, it is possible to prevent the heat sink for cooling MOSFETs Q1 and Q2 and the heat sink for cooling diodes D1 and D2 from increasing the sizes thereof. (The second and third aspects of the invention)

Here, it is assumed that the primary inductance of transformer T1 and the primary inductance of transformer T2 are the same Lp and that the leakage inductance value is small enough to be negligible as compared with the primary inductance value Lp. Then, the voltage conversion rate M of the circuit shown in FIG. 1 depends on the normalized frequency F as described in FIG. 3 with load weights as parameters.

Here, the normalized frequency F is the ratio of the switching frequency $F_s$ and the resonance frequency Fr of primary inductance Lp and capacitor Cs. If described by an equation, F=Fs/Fr.

Figure 3:
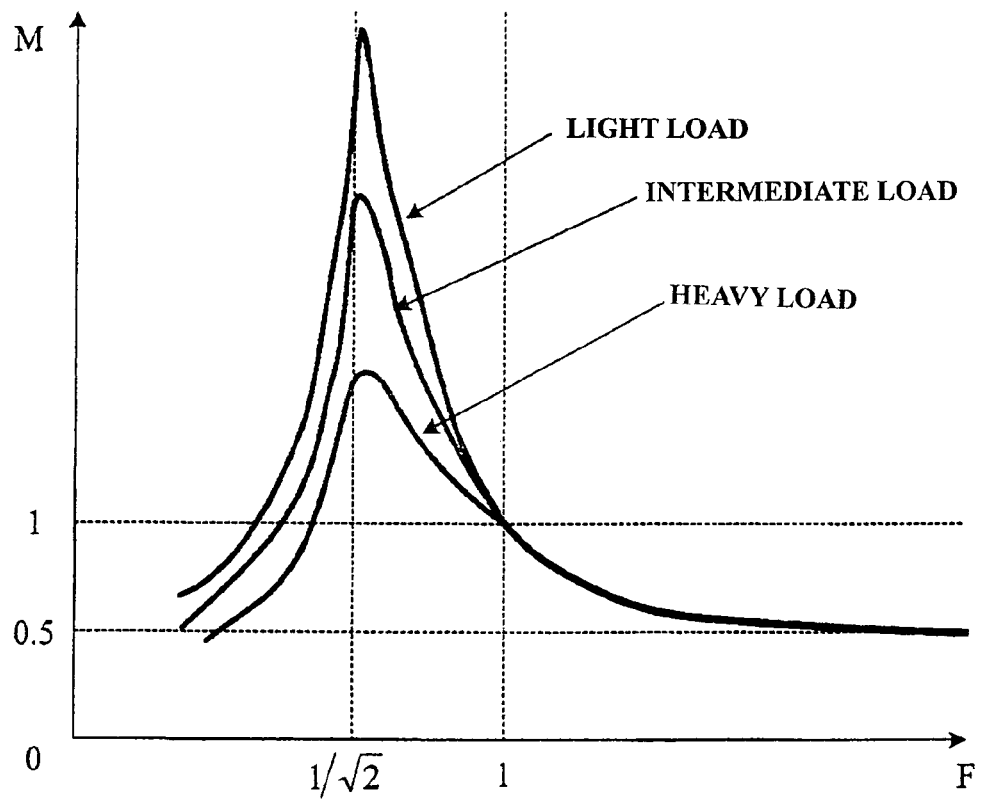
FIG. 3 is a graph relating the voltage conversion rate M of the circuit shown in FIG. 1 and the normalized frequency F with each other with load weights as parameters.

As FIG. 3 indicates, the voltage conversion rate M shows the maximum at the normalized frequency of $1/\sqrt{2}$ independently of the load weight. The reason for this is because the circuit shown in FIG. 1 works, at the normalized frequency higher than 1, through the resonance of the primary inductance Lp of transformer T1 or T2 and capacitor Cr. The reason for this is also because the circuit shown in FIG. 1 works, at the normalized frequency equal to or lower than 1, through the resonance of the sum of the primary inductance of transformer T1 and the primary inductance of transformer T2 and capacitor Cr.

Figure 8:
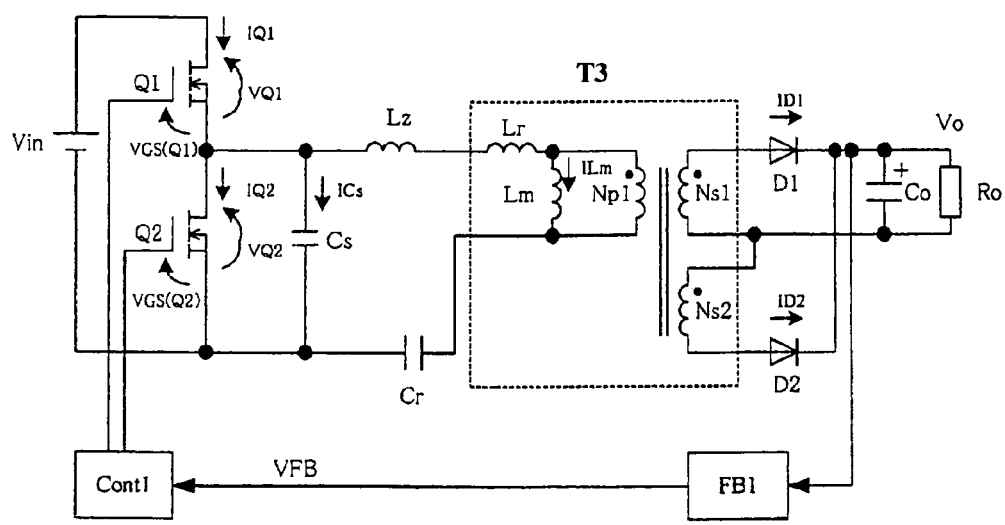
FIG. 8 is a block circuit diagram of another conventional switching power supply.

Since the current leading mode of operations is caused, in the same manner as in the circuit shown in FIG. 8, at the normalized frequency of less than $1/\sqrt{2}$ (F<$1/\sqrt{2}$), the circuit shown in FIG. 1 is made to work at the normalized frequency of higher than $1/\sqrt{2}$ (F>$1/\sqrt{2}$). Here, the normalized frequency F, at which the voltage conversion rate M shows the maximum, is constant independently of the load weight. Therefore, it is very easy to set the frequency Fmin, at which current leading mode is prevented from causing under all the unfavorable conditions including sudden change of the DC power supply voltage, sudden change caused in the load, and overload. In other words, it is possible to provide a very reliable switching power supply that does not cause any current leading mode.

Figure 9:
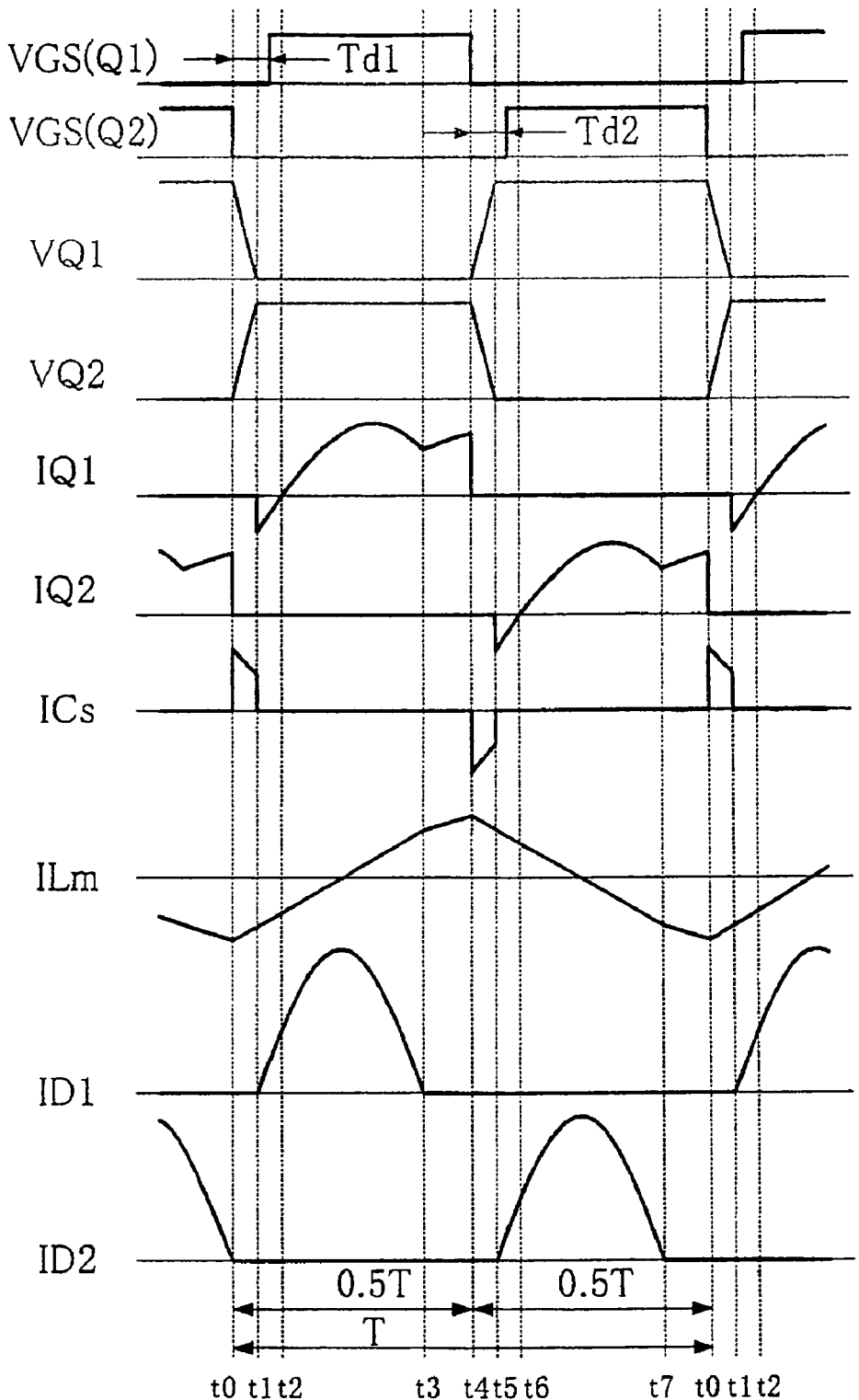
FIG. 9 is a wave chart describing the operations of the circuit shown in FIG. 8.
Figure 10:
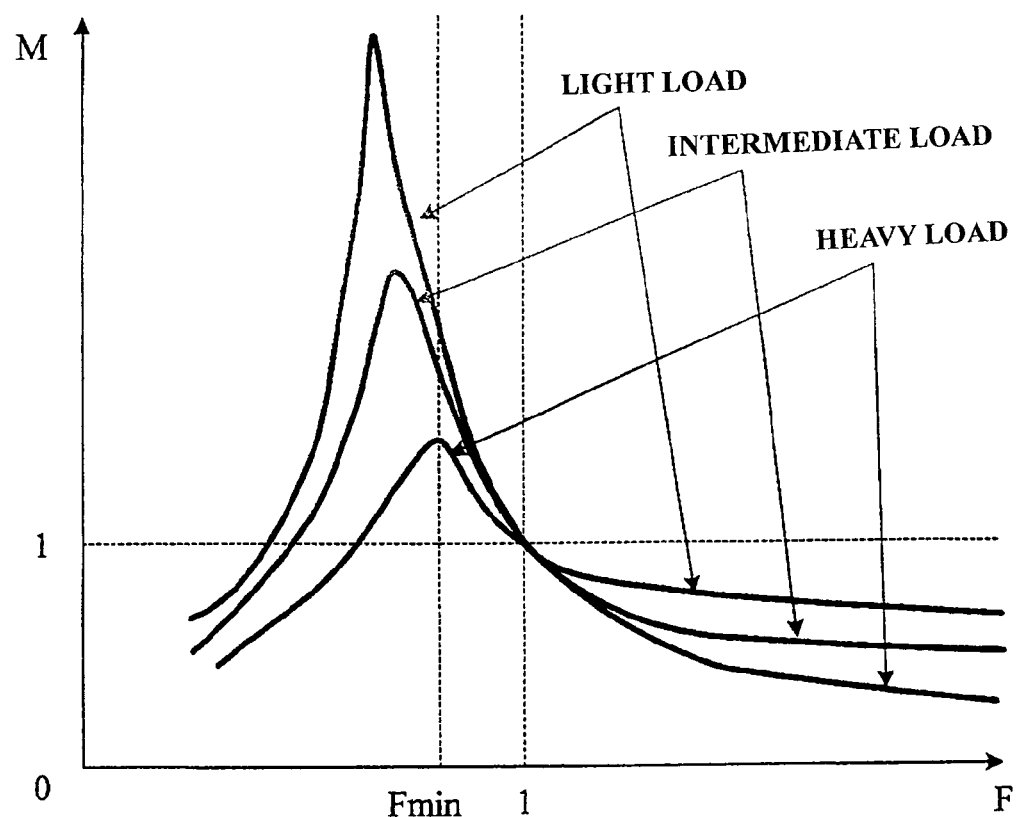
FIG. 10 is a graph relating to the voltage conversion rate M of the circuit shown in FIG. 8 and the normalized frequency F with each other with load weights as parameters.
Figure 11:
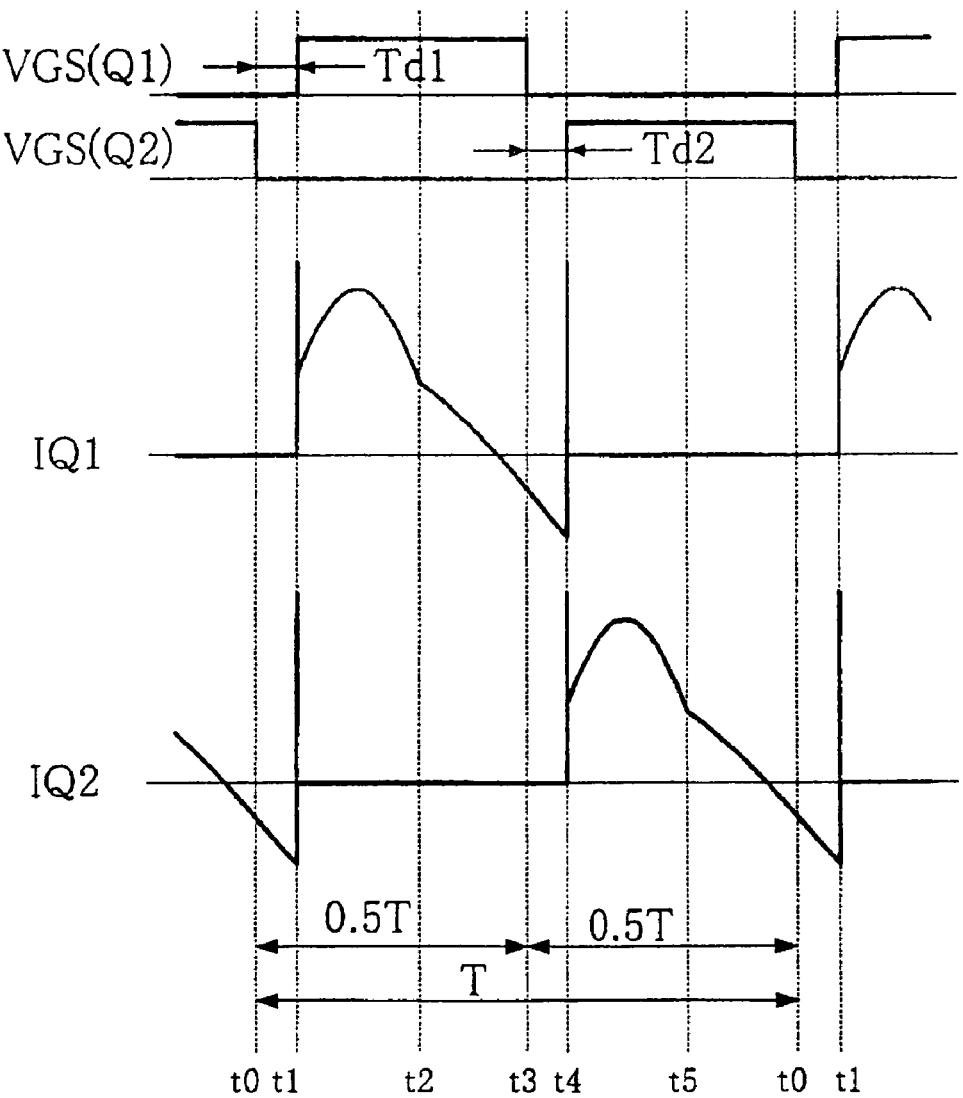
FIG. 11 is a wave chart describing the waveforms for explaining the problems of the circuit shown in FIG. 8.

At the normalized frequency between $1/\sqrt{2}$ and 1 ($1/\sqrt{2}$<F<1), there exists a period, for which the value of a synthesized current, obtained by rectifying and synthesizing currents ID1 and ID2 flowing through diodes D1 and D2, is zero. In this period, the waveforms of currents ID1 and ID2 are similar to those described in FIG. 9. The effective values of the currents flowing through diodes D1, D2 and smoothing capacitor $C_o$ are large.

At the normalized frequency F higher than 1, there exists no period, for which the synthesized current value ID1+ID2 is zero. An AC current is superposed slightly onto the DC current. It is possible to set the effective values of the currents flowing through diodes D1, D2 and smoothing capacitor $C_o$ to be smaller than those in the circuit shown in FIG. 8. Therefore, by setting the lowest operation frequency of control circuit Cont1 such that the normalized frequency F is higher than 1 according to the fourth aspect of the invention, it is possible to improve the conversion efficiency and to use smaller circuit component parts.

In the region, in which the normalized frequency F is higher than 1, the voltage conversion rate M converges to 0.5 as the normalized frequency F increases. Therefore, by setting the operation point such that the voltage conversion rate M is higher than 0.5 over the entire operation range of the switching power supply, it becomes possible to prevent the switching frequency from increasing too much. In detail, it is effective to set the winding ratio n of the transformers as described by the following relational expression, since the output voltage $V_o$ is equal to Vin·M/(2n). (The fifth aspect of the invention)

$$n > \text{Vin (max)} \cdot Mmin/(2V_o) = \text{Vin(max)}/(4V_o)$$

However, when the transformer winding ratio n is close to Vin(max)/(4 $V_o$), the switching frequency increases greatly under a light load and the conversion efficiency under the light load lowers. To obviate this problem, the switching frequency is fixed as the feedback signal value for controlling the DC output current exceeds the value corresponding to the maximum switching frequency and the ON-duties of the first and second switching devices are controlled variably. (The sixth aspect of the invention)

Figure 4:
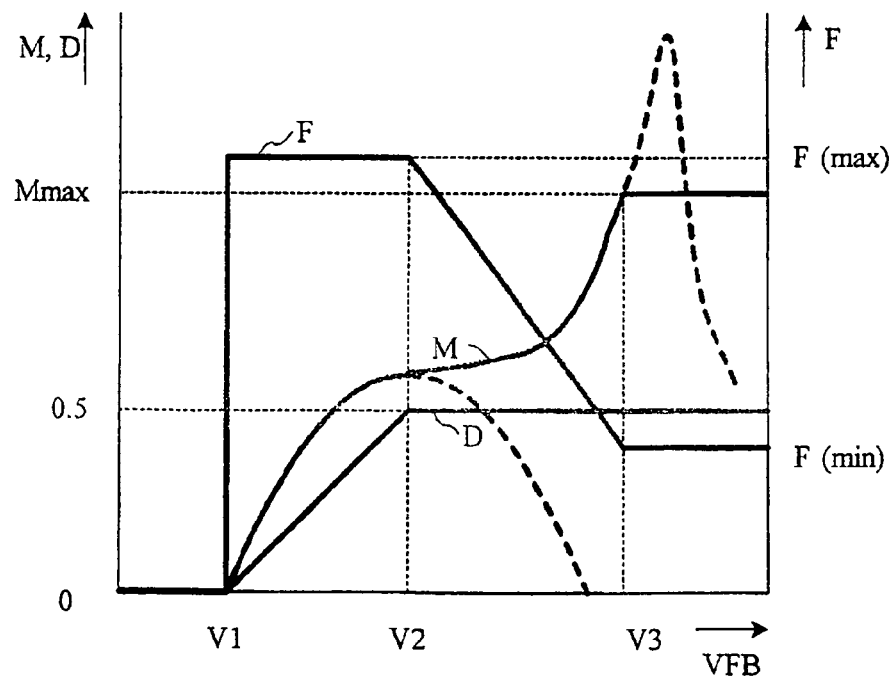
FIG. 4 is a diagram describing the characteristic control performances of the switching power supply according to the invention.

FIG. 4 is a diagram describing the characteristic control performances of the switching power supply according to the invention (according to the sixth aspect of the invention). Now the control performances of the switching power supply according to the invention will be described below with reference to FIG. 4.

In FIG. 4, the normalized frequency F and the ON-duty D are controlled in response to the feedback voltage VFB. In the range, in which the feedback voltage VFB is equal to or higher than a voltage V3, the ON-duty D is set at 0.5 and the switching frequency is limited to F(min) to prevent off-resonance from causing.

In the range, in which the feedback voltage VFB is equal to or lower than the voltage V3 and equal to or higher than a voltage V2, the ON-duty D is set at 0.5 and the switching frequency is controlled variably.

In the range, in which the feedback voltage VFB is equal to or lower than the voltage V2 and equal to or higher than a voltage V1, the switching frequency is limited to F(max) and the ON-duty D is controlled variably.

In the range, in which the feedback voltage VFB is equal to or lower than the voltage V1 and equal to or higher 0, the ON-duty D is set at 0 to stop the switching.

Due to the control schemes described above, the voltage conversion rate M is made to change continuously between 0 and Mmax. Thus, it is possible to control the output voltage $V_o$ at a constant value independently of the load weight without increasing the switching frequency excessively.

Now the seventh aspect of the invention will be described below.

When the transformer winding ratio n is set as described by the following relational expression, exciting currents ILm1 and ILm2 of transformers T1 and T2 do not cross zero under a heavy load but repeat rising and falling without changing the signs thereof.

$$n < \text{Vin (max)}/(4V_o)$$

In this case, the magnetic flux amplitudes of transformers T1 and T2 are smaller than the magnetic flux amplitudes in the case, in which exciting currents ILm1 and ILm2 cress zero. Therefore, it is possible to reduce the core losses and to improve the conversion efficiency.

However, the condition for controlling the output voltage $V_o$ at a constant value is given by the following relational expression.

$$M < \text{Vin (max)}/(2Vin)$$

The voltage conversion rate M is lower than 0.5, when the input voltage Vin shows the maximum. The minimum value of the voltage conversion rate M is 0.5 as the voltage conversion characteristics described in FIG. 3 indicate. Therefore, it means that the output voltage $V_o$ will exceed the set value thereof to the higher side under the operating conditions, under which the input voltage Vin shows the maximum, even when the switching frequency is set to be infinitesimally high. Therefore, the control method according to the sixth aspect of the invention makes it possible to set the voltage conversion rate M to be lower than 0.5 and to control the output voltage $V_o$ at a constant value over the entire input voltage range.

The disclosure of Japanese Patent Application No. 2008-011206 filed on Jan. 22, 2008 is incorporated as a reference.

While the invention has been explained with reference to the specific embodiments of the invention, the explanation is illustrative and the invention is limited only by the appended claims.

What is claimed is:

1. A switching power supply comprising:
   a DC power supply;
   a first series circuit connected in parallel to the DC power supply, the first series circuit comprising a first switching circuit and a second switching circuit connected in series to each other, the first switching circuit comprising a first parallel circuit having a first switching device, a first diode and a first capacitor, the second switching circuit comprising a second parallel circuit having a second switching device, a second diode and a second capacitor; and
   a second series circuit comprising an inductance element, a primary winding of a first transformer, a primary winding of a second transformer, and a capacitor, the second series circuit being connected in parallel to any of the first and second switching circuits;
   the switching power supply rectifying and smoothing a voltage generated across a secondary winding of the first transformer and a voltage generated across a secondary winding of the second transformer for obtaining a DC output;
   wherein the switching power supply turns on and off the first switching device and the second switching device alternately at a switching frequency higher than a series resonance frequency determined by a sum of an inductance value of the inductance element, an inductance value of the first transformer and an inductance value of the second transformer, and a static capacitance value of the capacitor.

2. The switching power supply according to claim 1, further comprising a control circuit that sets ON-duties of the first and second switching devices at 0.5 and adjusts the switching frequency for controlling a voltage of the DC output at a constant value.

3. The switching power supply according to claim 1, wherein
   a primary inductance value of the first transformer and a primary inductance value of the second transformer are almost equal to each other; and
   a winding ratio of the first transformer and a winding ratio of the second transformer are equal to each other.

4. The switching power supply according to claim 1, further comprising a control circuit controlling a minimum value of the switching frequency to be higher than a series resonance frequency determined by sum of the inductance value of the inductance element, an inductance value of the first transformer and an inductance value of the second transformer, and a static capacitance value of the capacitor.

5. The switching power supply according to claim 1, wherein a winding ratio n of the primary winding and the secondary winding in the first and second transformers is set to be described by a following relational expression, $n > \text{Vin (max)}/(4V_o)$, wherein Vin (max) is a maximum input voltage from the DC power supply and $V_o$ is a voltage of the DC output.

6. The switching power supply according to claim 1, further comprising a control circuit, which controls a switching frequency in response to a feedback signal for controlling a voltage of the DC output, fixes the switching frequency in response to the feedback signal exceeding a value corresponding to an upper limit value of the switching frequency to the lower side, and changes ON-duties of the first and second switching devices variably for controlling the voltage of the DC output.

7. The switching power supply according to claim 1, wherein
   a winding ratio n of the primary and secondary windings in the first and second transformers is set to be described by a following relational expression, $n < \text{Vin (max)}/(4V_o)$, wherein Vin (max) is a maximum input voltage from the DC power supply and $V_o$ is a voltage of the DC output; and
   the switching power supply comprises a control circuit, which controls a switching frequency in response to a feedback signal for controlling the voltage of the DC output, fixes the switching frequency in response to the feedback signal exceeding a value corresponding to an upper limit value of the switching frequency to the lower side, and changes ON-duties of the first and second switching devices variably for controlling the voltage of the DC output.

* * * * *